US011868377B2

(12) United States Patent
Simonson

(10) Patent No.: US 11,868,377 B2
(45) Date of Patent: Jan. 9, 2024

(54) SYSTEMS AND METHODS FOR PROVIDING GEODATA SIMILARITY

(71) Applicant: CACI, Inc. - Federal, Arlington, VA (US)

(72) Inventor: Peter Storm Simonson, Arlington, VA (US)

(73) Assignee: CACI, Inc.—Federal, Reston, VA (US)

( * ) Notice: Subject to any disclaimer, the term of this patent is extended or adjusted under 35 U.S.C. 154(b) by 55 days.

(21) Appl. No.: 16/864,677

(22) Filed: May 1, 2020

(65) Prior Publication Data
US 2021/0342372 A1   Nov. 4, 2021

(51) Int. Cl.
*G06F 16/29* (2019.01)
*G06F 16/25* (2019.01)
*G06F 16/2458* (2019.01)
*G06F 16/2457* (2019.01)
*G06F 16/248* (2019.01)

(52) U.S. Cl.
CPC ............ *G06F 16/29* (2019.01); *G06F 16/248* (2019.01); *G06F 16/2458* (2019.01); *G06F 16/24573* (2019.01); *G06F 16/25* (2019.01)

(58) Field of Classification Search
CPC .... G06F 16/29; G06F 16/24573; G06F 16/25; G06F 16/248; G06T 11/203; G06T 15/00
See application file for complete search history.

(56) References Cited

U.S. PATENT DOCUMENTS

| 7,085,650 | B2* | 8/2006 | Anderson | G06T 17/05 |
| | | | | 702/150 |
| 8,508,533 | B2* | 8/2013 | Cervelli | G06T 9/001 |
| | | | | 345/441 |
| 2004/0263514 | A1* | 12/2004 | Jin | G06K 9/0063 |
| | | | | 345/440 |
| 2011/0161875 | A1* | 6/2011 | Kankainen | G06F 3/0481 |
| | | | | 715/810 |

(Continued)

OTHER PUBLICATIONS

Bader et al. "Detecting and Resolving size and Proximity Conflicts in the Generatlization of Polygonal Maps", Procesings 18th International Cartographica Conference, Stockholm Jun. 23-27, 1997.*

(Continued)

*Primary Examiner* — Yuk Ting Choi
(74) *Attorney, Agent, or Firm* — BakerHostetler

(57) ABSTRACT

A system may be configured to conflate vectorized source data. Some embodiments may: obtain first data from a first source and second data from a second source; determine a first polygon that encloses all features of the first data and a second polygon that encloses all features of the second data; determine a larger polygon that encloses the first and second polygons; divide the larger polygon into first tiles; extract, from each of the first tiles overlaying the first data and from the each tile overlaying the second data, a first set of features and a second set of features, respectively; and identify, based on a computed disagreement level satisfying a set of criteria, each of one or more of the tiles. A set of identified tiles or all of the tiles may then be displayed, including shaded indicators overlaying features of respective portions of the first and second data.

19 Claims, 12 Drawing Sheets

(56) References Cited

U.S. PATENT DOCUMENTS

| | | | | |
|---|---|---|---|---|
| 2013/0076732 A1* | 3/2013 | Cervelli | .................. | G06T 9/001 |
| | | | | 345/419 |
| 2013/0322702 A1* | 12/2013 | Piemonte | ............... | G01C 21/26 |
| | | | | 382/113 |
| 2015/0262398 A1* | 9/2015 | Iskander | ............... | G06T 15/005 |
| | | | | 345/420 |
| 2018/0357797 A1* | 12/2018 | Thompson | ............ | G06T 11/203 |
| | | | | 707/999.003 |

OTHER PUBLICATIONS

Gao et al. Detecting Geometric Conflicts for Generalisation of Polygonal Maps, The Cartograpihcal Jounral vol. 49 No. 1, pp. Feb. 21-29, 2012.*

Agoston, Max. "Coputer Graphicas and Geometric Modeling", Springer, 2004.*

\* cited by examiner

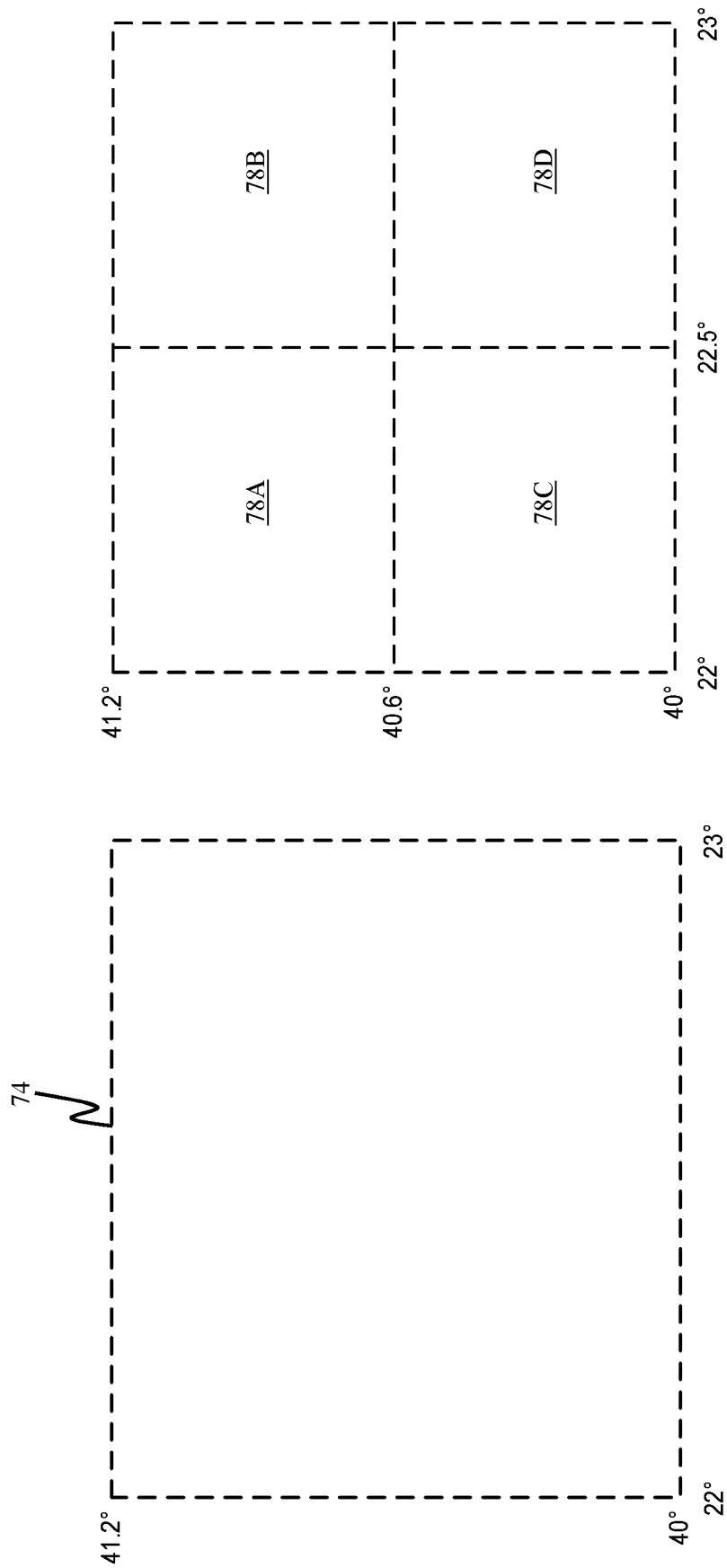

SYSTEMS AND METHODS FOR PROVIDING GEODATA SIMILARITY

TECHNICAL FIELD

The present disclosure relates generally to systems and methods for aiding data sources' conflation by locally visualizing, for a user, particularly identified portions of geographical features.

BACKGROUND

A user (e.g., a geospatial intelligence collections agent or analyst) is known to be provided different depictions of a network of existing roads. The user is further known to have ability to visualize such different sources using geographic information system (GIS) software, such as ArcGIS, QGIS, and the like, and this user is known to be tasked with making the depictions agree. By overlaying the data sources, the user may determine various (e.g., hundreds, thousands, or even millions) areas of disagreement between the different depictions. The sheer number of issues is often overwhelming and even a zooming-in to particular regions for closer inspection may be unavailing, since the user would then have to systematically iterate through all such local regions where intervention is required, before making the necessary adjustments.

Geodata analysts are known to possess tools for conflating sources, but any such tools only return results of acceptable quality when the sources are substantially similar. That is, the user must often laboriously, manually, and erroneously (as humans are prone to error) preprocess the sources to assure reasonable agreement prior to applying the conflation tools. Generally, the extent to which the sources agree varies locally, with some local regions requiring only a little, manual adjustment but others requiring substantially more adjustment. There is thus a need for a strategic process for aiding reconciliation.

SUMMARY

Systems and methods are disclosed for quantifiably identifying areas of disagreement between similar data sources. Accordingly, one or more aspects of the present disclosure relate to a method for: obtaining first data from a first source and second data from a second source; determining a first polygon that encloses all features of the first data and a second polygon that encloses all features of the second data; determining a larger polygon that encloses the first and second polygons; dividing the larger polygon into first tiles; extracting, from each of the first tiles overlaying the first data and from the each tile overlaying the second data, a first set of features and a second set of features, respectively; and identifying, based on a computed disagreement level satisfying a set of criteria, each of one or more of the tiles. A set of identified tiles or all of the tiles may then be displayed, including emphasizing indicators overlaying features of respective portions of the first and second data.

The method is implemented by a system comprising one or more hardware processors configured by machine-readable instructions and/or other components. The system comprises the one or more processors and other components or media, e.g., upon which machine-readable instructions may be executed. Implementations of any of the described techniques and architectures may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

FIG. 4A illustrates a bigger bounding box and FIG. 4B illustrates the bigger bounding box being segmented into tiles, in accordance with one or more embodiments.

DETAILED DESCRIPTION

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Presently disclosed are ways of assisting performance of conflating geospatial data, by identifying and strategically displaying disagreement areas. More particularly, system 10 of FIG. 1 is disclosed, which may produce accurate georeferenced vector labels corresponding to transport networks in a particular geographic region.

Different data sources often do not fully agree. For example, GPS records may be spatially precise but fail to cover the entire road network, and extraction from aerial imagery may contain omissions due to occlusion by vegetation, clouds, or other known obstacles. Rather than analysts spending extensive amounts of time imperfectly reviewing vast spatial regions and deciding which elements to (i) incorporate as is, (ii) merge, or (iii) eliminate, the disclosed approach facilitates systematic processing of differences between sources by automatically comparing two sources of geodata covering the same spatial region and by generating a georeferenced image. More particularly, processor(s) 20 of system 10 may drop the image into existing GIS software to provide quick visual indicators of the local, identified regions where the sources most closely agree and where they are most dissimilar. And processor(s) 20 may be configured to identify which spatial regions can safely be handled with automated processes, the remainder being potentially better suited for human attention.

Figure 1:
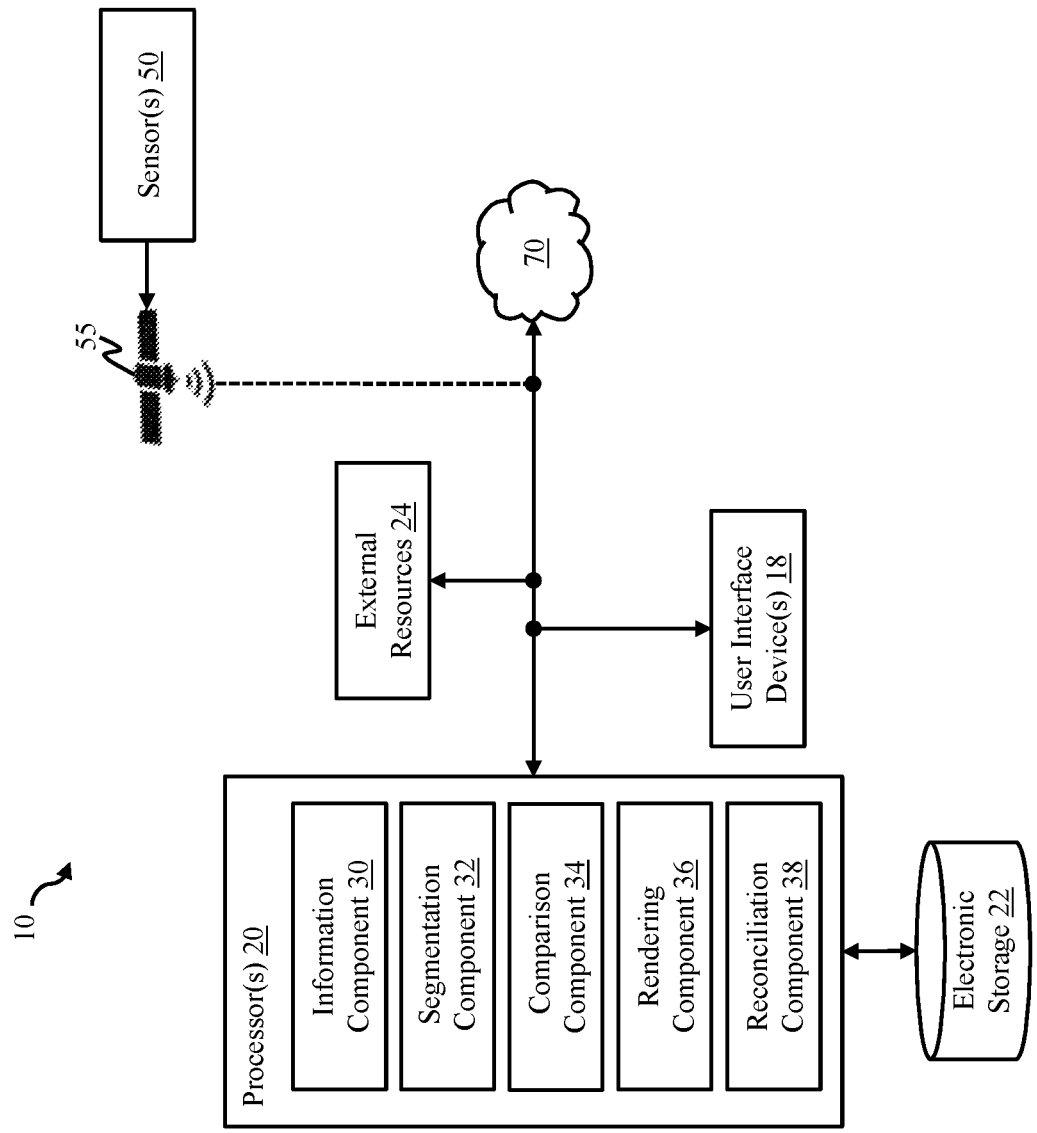
FIG. 1 illustrates an example of a system in which dissimilarity between sets of source data is determined and representationally rendered, in accordance with one or more embodiments.

As shown in FIG. 1, processor(s) 20 is configured via machine-readable instructions to execute one or more computer program components. The computer program components may comprise one or more of information component 30, segmentation component 32, comparison component 34, rendering component 36, reconciliation component 38, and/or other components. Processor 20 may be configured to execute components 30, 32, 34, 36, and/or 38 by: software; hardware; firmware; some combination of software, hardware, and/or firmware; and/or other mechanisms for configuring processing capabilities on processor 20.

In some embodiments, processor(s) 20 may belong to a user device, a consumer electronics device, a mobile phone, a smartphone, a personal data assistant, a digital tablet/pad computer, a wearable device (e.g., watch), a personal computer, a laptop computer, a notebook computer, a work station, a server, a high performance computer (HPC), a vehicle computer, a game or entertainment system, a set-top-box or any other device. As such, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, UI devices 18, devices that are part of external resources 24, electronic storage 22, and/or other devices).

It should be appreciated that although components 30, 32, 34, 36, and 38 are illustrated in FIG. 1 as being co-located within a single processing unit, in embodiments in which processor 20 comprises multiple processing units, one or more of components 30, 32, 34, 36, and/or 38 may be located remotely from the other components. For example, in some embodiments, each of processor components 30, 32, 34, 36, and 38 may comprise a separate and distinct set of processors. The description of the functionality provided by the different components 30, 32, 34, 36, and/or 38 described below is for illustrative purposes, and is not intended to be limiting, as any of components 30, 32, 34, 36, and/or 38 may provide more or less functionality than is described. For example, one or more of components 30, 32, 34, 36, and/or 38 may be eliminated, and some or all of its functionality may be provided by other components 30, 32, 34, 36, and/or 38. As another example, processor 20 may be configured to execute one or more additional components that may perform some or all of the functionality attributed below to one of components 30, 32, 34, 36, and/or 38.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., RAM, EPROM, EEPROM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply, a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 24 may be provided by other components or resources included in system 10. Processor 20, external resources 24, user interface device 18, electronic storage 22, network 70, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN)), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

User interface (UI) device(s) 18 of system 10 may be configured to provide an interface between one or more users and system 10. UI devices 18 are configured to provide information to and/or receive information from the one or more users. UI devices 18 include a user interface and/or other components. The UI may be and/or include a graphical UI configured to present views and/or fields configured to receive entry and/or selection with respect to particular functionality of system 10, and/or provide and/or receive other information. In some embodiments, the UI of UI devices 18 may include a plurality of separate interfaces associated with processor(s) 20 and/or other components of system 10. Examples of interface devices suitable for inclusion in UI device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that UI devices 18 include a removable storage interface. In this example, information may be loaded into UI devices 18 from removable storage (e.g., a smart card, a flash drive, a removable disk) that enables users to customize the implementation of UI devices 18.

In some embodiments, UI devices 18 are configured to provide a UI, processing capabilities, databases, and/or electronic storage to system 10. As such, UI devices 18 may include processors 20, electronic storage 22, external resources 24, and/or other components of system 10. In some embodiments, UI devices 18 are connected to a network (e.g., the Internet). In some embodiments, UI devices 18 do not include processor 20, electronic storage 22, external resources 24, and/or other components of system 10, but instead communicate with these components via dedicated lines, a bus, a switch, network, or other communication means. The communication may be wireless or wired. In some embodiments, UI devices 18 are laptops, desktop computers, smartphones, tablet computers, and/or other UI devices.

Data and content may be exchanged between the various components of the system 10 through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

In some embodiments, sensor(s) 50 may be a charge-coupled device (CCD), an active pixel sensor (e.g., CMOS-based), wide-area motion imagery (WAMI) sensor, passive infrared sensor, ultraviolet radiation sensor, X-ray based, radar based, laser altimeter, radar altimeter, light detection and ranging (LIDAR), radiometer, photometer, spectropolarimetric imager, simultaneous multi-spectral platform (e.g., Landsat), hyperspectral imager, geodetic remote sensor, acoustic sensor (e.g., sonar, seismogram, ultrasound, etc.), or another image capturing device.

In some embodiments, sensor(s) 50 may output an image (e.g., a TIFF file) taken at an altitude, e.g., from satellite 55 or an aircraft 55 (e.g., aerostat, drone, plane, balloon, dirigible, kite, and the like). One or more images may be taken, via mono, stereo, or another combination of a set of sensors. The image(s) may be taken instantaneously or over a period of time. In some embodiments, the input aerial or satellite image may be one of a series of images. For example, the herein-described approach may be applied to a live or on-demand video segment of a geographic region. Exemplary image features include visual features of one or more aspects of the image(s). A feature may be an interesting part of an image. For example, features or patterns may be one or more of textures, edges, corners, regions, shadings, shapes, ridges, straight lines, crosses, T-junctions, Y-junctions, or other characteristics of the image.

In some embodiments, information component 30 may be configured to obtain source data, via electronic storage 22, external resources 24, network 70, UI device(s) 18, a satellite database (e.g., DigitalGlobe), and/or directly from sensor(s) 50. In these embodiments, these components may be connected to network 70 (e.g., the Internet). The connection to network 70 may be wireless or wired.

In some embodiments, information component 30 may obtain a pixel map (e.g., predicted via a machine learner), within which geo-intelligence (GEOINT) features may be encoded. In these or other embodiments, information component 30 may obtain vectorized pixel maps. As such, some embodiments of processor(s) 20 may operate using one or more roads extracted from aerial imagery. Pixels of the pixel map (e.g., of a map, chart, etc.) may be associated with binary values, e.g., which encode foundational GEOINT features or representations of a geographic and/or global features having at least one of spatial representation(s), shape(s), and a set of attributes. For example, some of said pixels may form part of a particular object type (e.g., road, building, etc.). In this or another example, each pixel may be colored (e.g., white) where there are no roads present and colored differently (e.g., black) where there are roads present.

In some embodiments, information component 30 may obtain data objects from semantically segmented satellite imagery. For instance, information component 30 may obtain a vectorized pixel map, which may originally be determined from an image of a city block and which the pixel map may be converted into two-dimensional vectors. This pixel map may show what type or class of object each pixel in the image is part of (e.g., road, background, etc.). Each of the vectors may comprise one or more points, lines, vertices, and/or polygons.

Figure 2B:
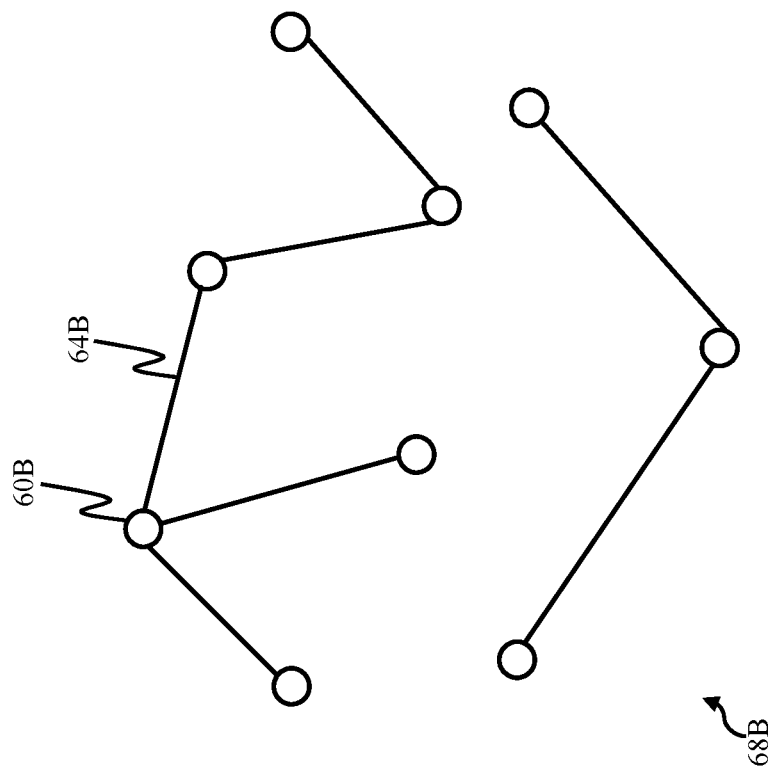
FIG. 2A illustrates source data and FIG. 2B illustrates other source data, in accordance with one or more embodiments.
Figure 2A:
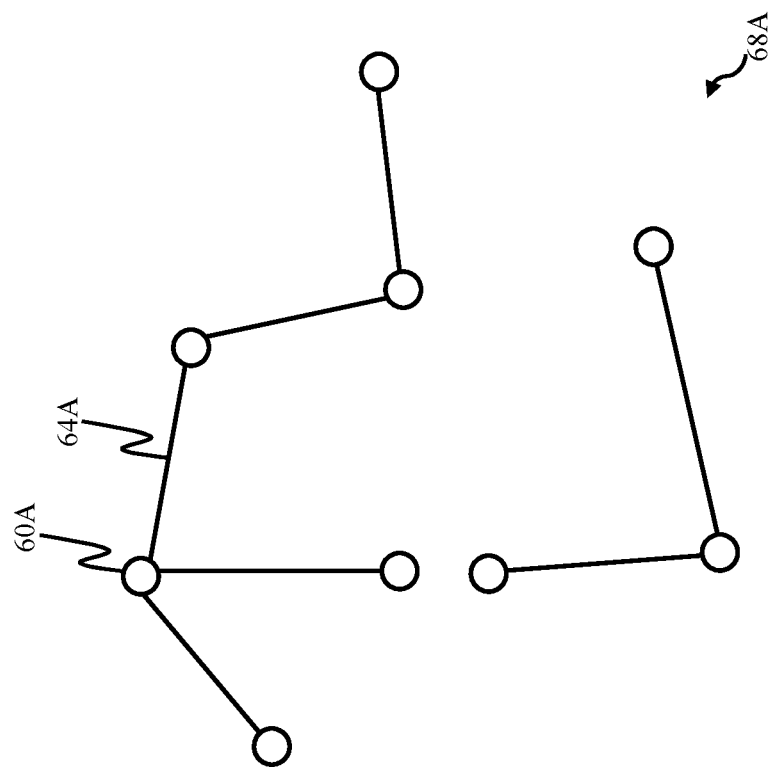

FIG. 2A depicts vertices of first dataset 68A as dots 60A and depicts roads of the same, first dataset as lines or edges 64A. FIG. 2B depicts vertices of second dataset 68B as dots 60B and depicts roads of the same, second dataset as lines or edges 64B. These depictions may exist as such because dots of the respective datasets may be placed down the middle of a road, and the dots may be connected. The dots may thus represent information that is encoded in the datasets, and the lines may also be encoded by identifying dots that are all part of one line. The features of FIG. 2A may pertain to first dataset 68A, and the features of FIG. 2B may pertain to second dataset 68B, both datasets generally pertaining to a same region of interest.

In some embodiments, information component 30 may obtain source data of any particular type (e.g., geometry, geodatabase, environmental systems research institute (ESRI) shapefile (.shp), geoJSON, TopoJSON, or another file type). For example, comparison component 34 may compare two predicted outputs of a neural network at the picture level (e.g., before vectorization). Or comparison component 34 may compare two vectorized datasets. In another example, they may include files of a type that comprises a list or table of starting and ending points, each object instance being in a coordinate system (e.g., based on X and Y axes or any other set of axes). As such, this component may obtain data of different types, e.g., from sources providing vector datasets, spatial raster datasets, or a combination of datasets. Segmentation component 32 and/or comparison component 34 may support two spatial vector datasets, two spatial raster datasets, or one of each of these types. In the latter exemplary implementation, information component 30 may initially convert one of those datasets to be the same type as the other (e.g., by vectorizing the spatial raster imagery or by transforming the vectorized list of roads into imagery).

In some embodiments, information component 30 may obtain transportation network label sets for a region of interest. These sets may be obtained from same or different vendors, each being collected, e.g., via a different method. For example, one vendor may extract a network structure from global positioning system (GPS) logs for commercial vehicles operating in the region, while another vendor may produce labels by manually labeling aerial imagery. In some embodiments, reconciliation component 38 may assist the user tasked with reconciling and combining ("conflating") these two sources. For example, reconciliation component 38 may be configured to form a road dataset by combining road lines extracted from a hand-drawn surveyor's map, road lines extracted from automobile GPS records, and road lines extracted from aerial imagery.

Roads of source data (e.g., 68A, 68B, 98A, 98B, etc.) may exemplarily be represented having any suitable thickness, e.g., with one or more pixels, and may comprise a set of values in a structure for the vectors that encode turns, curves, dead-ends, lanes, and intersections (e.g., three-way, four-way, circle, or another type of intersection).

Upon converting a pixel map into vectors, e.g., in phased fashion, the vectors may be transformed from pixel-space into a coordinate system of the input image. This transformation may be performed using associated georeferencing information. For example, the parent satellite imagery may be passed in as GeoTIFF files, which may include the necessary transformation parameters. Information component 30 may then write an output of this activity to an ESRI shapefile. The roads, which may be stored as geospatial vector data, may now be able to be viewed and edited via GIS software.

In some embodiments, the file type(s) of obtained source data (e.g., 68A, 68B, 98A, 98B, etc.) may comprise a main file, an index file, and/or a dBASE table. The shapes may be described with (e.g., a list of) vertices. There may be a relationship between geometry and feature attributes, which may non-spatially describe the item. Record contents of a shape file may comprise a shape type followed by geometric data for the shape. By looking at a file of such type, a user may see what type of feature and object it is. For example, information component 30 may obtain data formatted as a shapefile, which spatially describes vector features, such as by coordinates associated with each point, line(s), and/or polygon(s). In this or another example, the vectors optionally represent objects of a different type. For example, a user may be displayed the type of road, e.g. whether it is a hard paved asphalt surface, concrete, a dirt road, etc., and/or the user may be displayed information about objects different from roads (e.g., buildings, other infrastructure, bodies of water, etc.).

In some embodiments, information component 30 may obtain geo-data and/or obtain geo-referenced imagery, from one or more sources. Geo-data may comprise geometric information in a format (e.g., spreadsheet). As such, the geo-data may comprise a plurality of rows of geographic information, such as point locations in a coordinates' list. Geo-data may thus not have any actual imagery data associated with it, whereas geo-referenced imagery may encode its data in imagery form. In some embodiments, information component 30 may obtain geometry and vectorized road networks each with a certain quality.

In an example of geo-data, a road may be represented as two lines that go from point A, to point B, to point C, each point having a geometric location and associated attribute descriptors that are stored. In an example of geo-imagery, a road may be represented with a raster graphics image that has embedded georeferencing information. Georeferencing implies an internal coordinate system of a map or aerial image being related to a ground system of geographic coordinates. In other words, georeferencing implies associating a physical map or raster image of a map with physical, spatial locations.

Figure 7A:
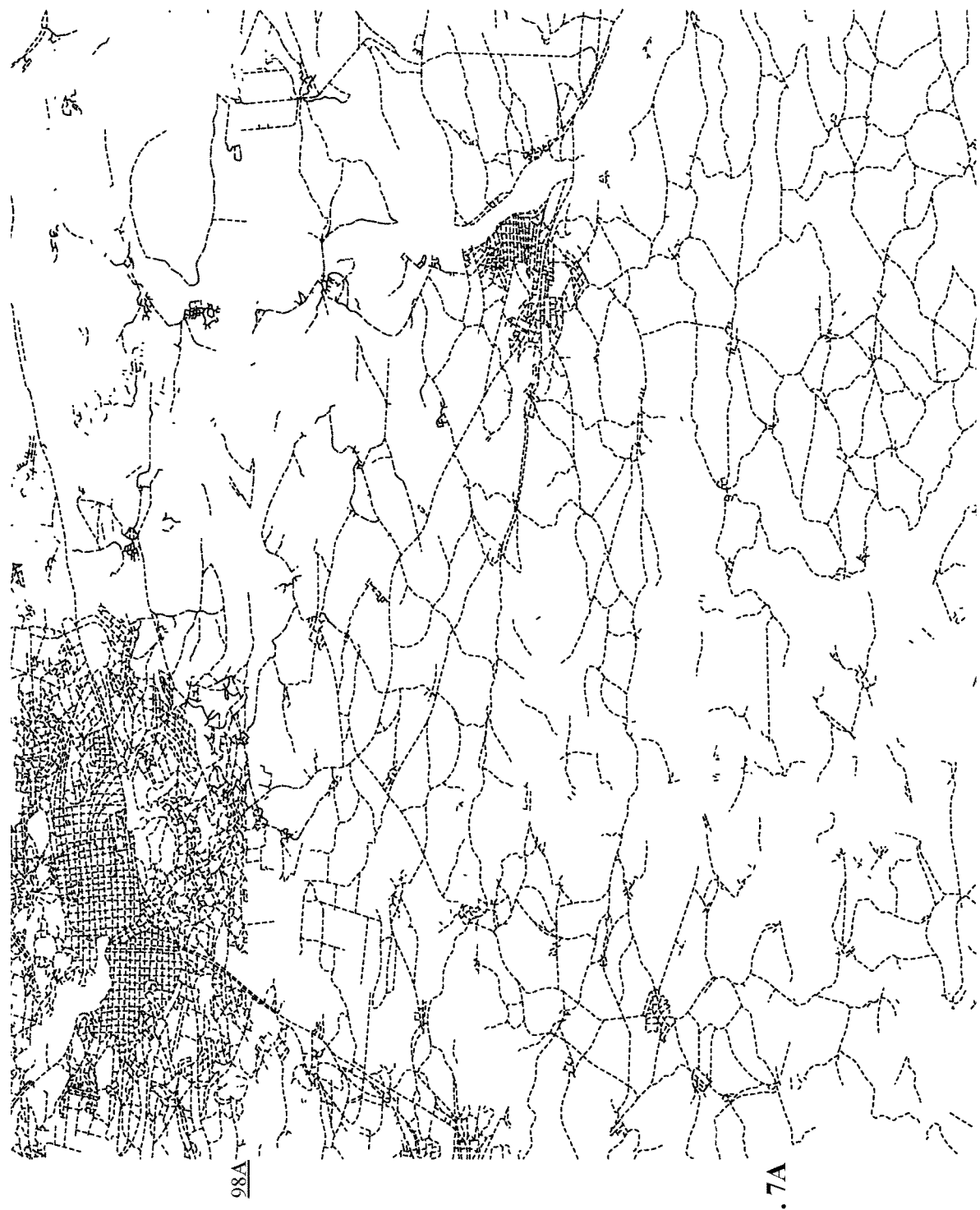
FIG. 7A illustrates an entire region of interest of first source data and FIG. 7B illustrates a similar region of interest of second source data, in accordance with one or more embodiments.
Figure 7B:

In some embodiments, rendering component 36 interprets at least two sets of source vectors to conflate and draws them in a space, effectively displaying the vectors from a structured set of numbers. For example, FIG. 7A depicts use of GIS software to display dotted lines 98A that visualize or represent a first vectorized source, and FIG. 7B depicts use of GIS software to display solid lines 98B that visualize or represent a second vectorized source, each of these depictions being on a scale of a couple of kilometers by a couple of kilometers. In some embodiments, reconciliation component 38 may reconcile the two sources with or without displaying problem areas. But these embodiments are not intended to be limiting, as any number of sets (e.g., three or more) of source vectors are contemplated for display and reconciliation. Further, these components may be configured to support source data from imagery (raster), i.e., rather than structured sets (vectors).

In some embodiments, segmentation component 32 may determine that two data sources (e.g., 68A, 68B, 98A, 98B, etc.) refer to a same region by building a shared frame. For example, this component may determine a bounding box for each of a first dataset and a second dataset. A bounding box here is defined as any polygon that has spatial coordinates associated with each of its vertices, such as a set of four corners in rectangular implementations. These coordinates may be two or three dimensional, e.g., with two of the dimensions being latitude and longitude and with an optional third being altitude.

Figure 3B:
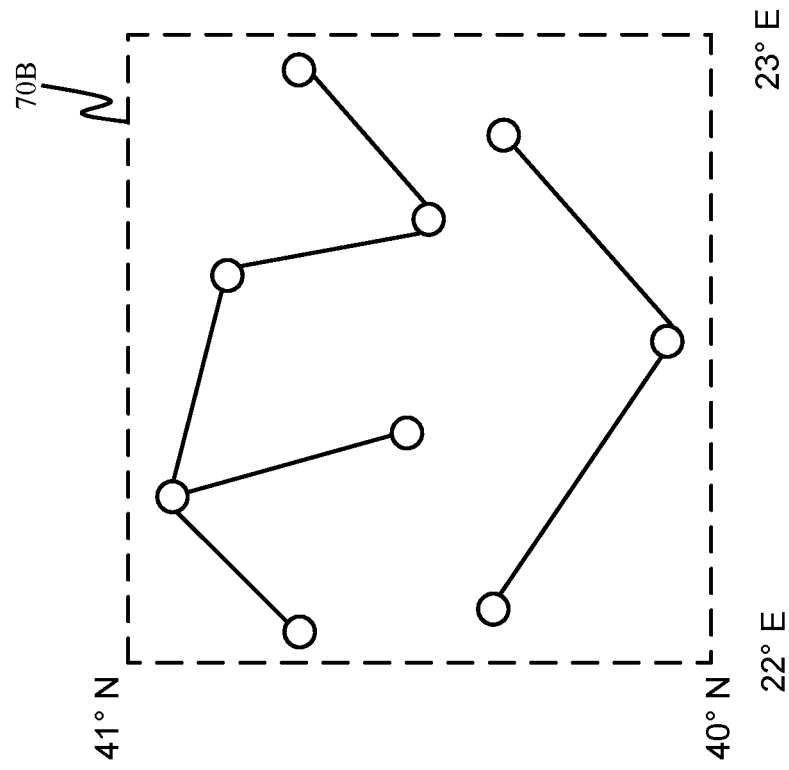
FIG. 3A illustrates the source data being bounded and FIG. 3B illustrates the other source data being bounded, in accordance with one or more embodiments.
Figure 3A:
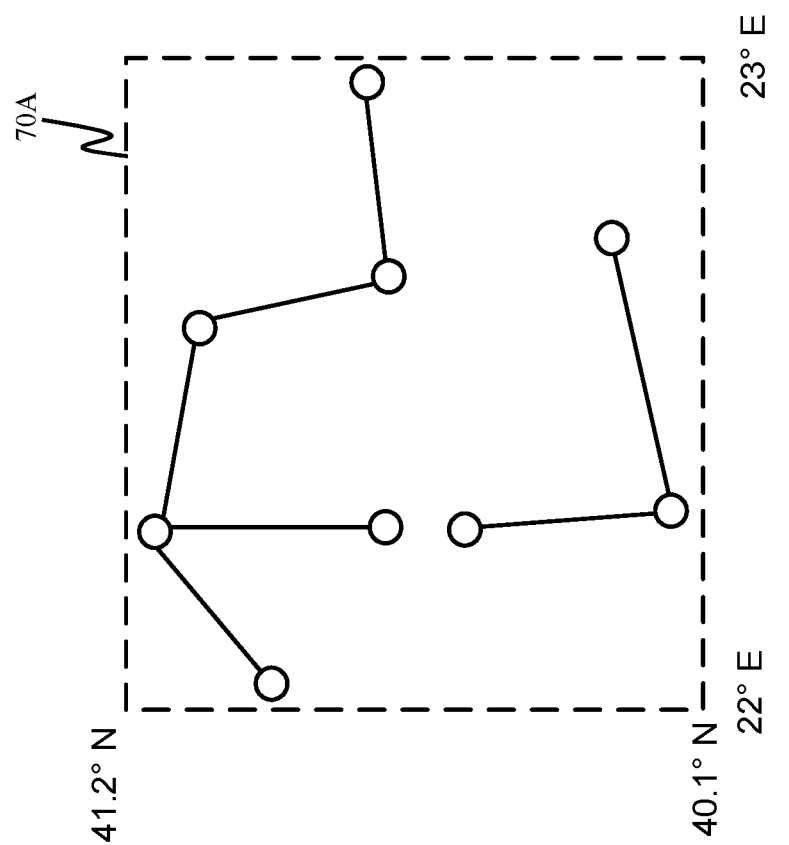

To build each bounding box (e.g., 70A, 70B, etc.), segmentation component 32 may identify every single feature or point that is in each dataset, gather all of the X and Y coordinates, and determine what the smallest and largest X coordinates of these points. This implies that all of the points are going to be between these minimum and maximum X values. Segmentation component 32 may perform the same for the Y coordinates. With these four pieces of information, segmentation component 32 may identify a polygon that tightly encloses all of the points in each dataset, all of the edges or lines connecting the points being within the respective enclosure as well. FIGS. 3A-3B each depict a different bounding box for the different datasets.

In some embodiments, segmentation component 32 may cause an error message to be output, e.g., when the bounding boxes for the different datasets do not have any overlapping area (and thus no relative disagreements to calculate). Naturally, different datasets captured using different means may have geometric values for features that are not in both sources, since the two sources do not actually cover the exact same spatial region. In some embodiments, segmentation component 32 may determine whether any overlapping region exists between the different bounding boxes such that the determination of the larger bounding box is performed responsive to the determination that the overlapping region exists.

In some embodiments, segmentation component 32 may then determine bounding box 74, which may be slightly larger than each of the dataset's bounding boxes (e.g., 70A, 70B, etc.). Segmentation component 32 component may thus determine a combined bounding box by identifying a minimum X coordinate value (e.g., 22° East) in each of the first and second boxes such that a minimum X value of the overall, larger bounding box is smallest of the two X values; segmentation component 32 may repeat this identification for Y coordinate values (e.g., 40° North). By choosing these X and Y values to determine the larger bounding box, there may never be a line crossing outside of the bounding box, the bounding boxes being entirely learned from the input datasets. Segmentation component 32 may then segment or divide the larger bounding box based on a size of desired tiles. FIGS. 4A-4B exemplarily show a subdivision of larger bounding box 74 to a two by two configuration of tiles 78 (i.e., 78A, 78B, 78C, and 78D).

In some embodiments, information component 30 may obtain a configuration value (e.g., via a user using UI device 18) for setting a size of each of the tiles (which may all have a same size). In these or other embodiments, sizes of the tiles may be scaled to dimensions of one or more displays. And the tiles may be polygonal, e.g., where a type of polygon (triangle, rectangle, hexagon, etc.) is similarly configurable by the user analyst. In some embodiments, information component 30 may determine one or both of these configurations based on a tradeoff, namely where very fine or granular tiles would result in millions of tiles for a dataset rather than a few hundred thousand tiles. For ease of convenience, FIG. 9 exemplarily shows 64 tiles by 64 tiles. Too many tiles may be counterproductive and result in displays that are no longer useable by an analyst. For example, 150,000 tiles with disagreements would not be practical so the larger the tiles are the fewer of them requiring inspection and/or correction. And of course this also may depend on the actual spatial extent of the source data, i.e., where different tile sizes are more practical for differently sized datasets. As such, segmentation component 32 in concert with rendering component 36 may optimize tile size settings for the user based on the source datasets or based on an input region size (e.g., 100 meters by 100 meters).

As mentioned, some implementations may cause identification of thousands or even millions of areas of disagreement from data of disparate sources. Manual inspection of such scenarios is problematically infeasible, such tasking being impractical for performance by a human.

Figure 5B:
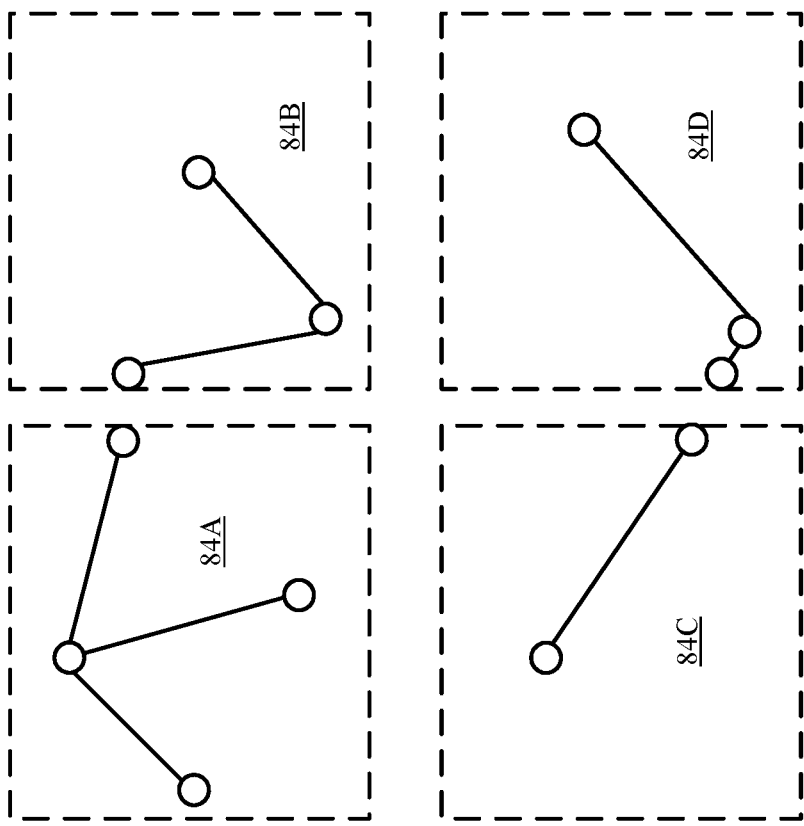
FIG. 5A illustrates respective portions of the source data in the tiles and FIG. 5B illustrates respective portions of the other source data in the tiles, in accordance with one or more embodiments.
Figure 5A:
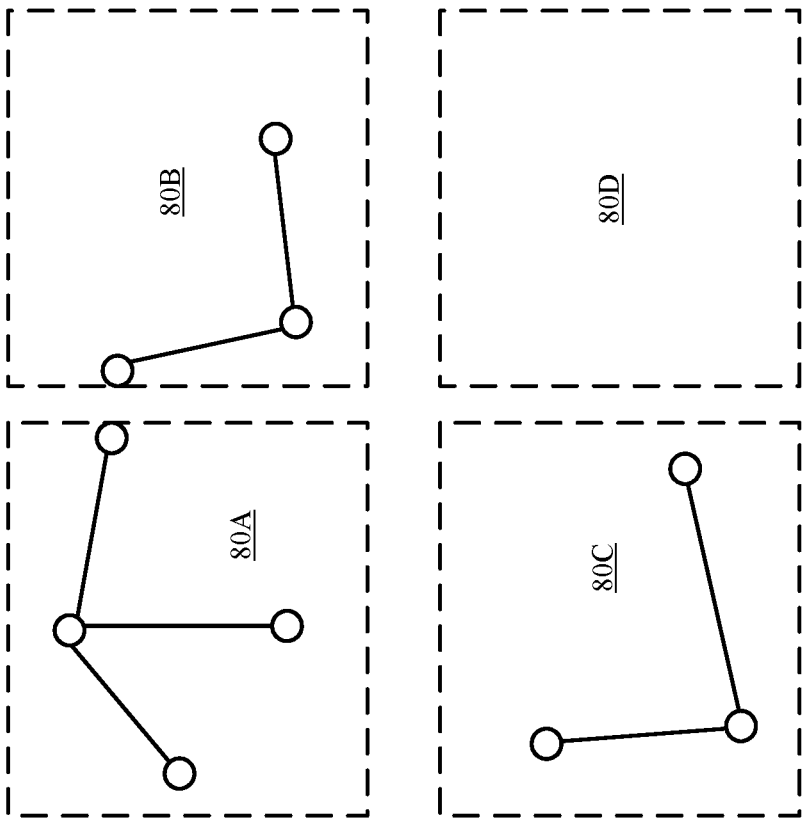

In some embodiments, comparison component 34 may overlay (e.g., using Python Geopandas) tiles 78 of the subdivision over a subset of a source dataset to identify features in the subset. In other words, this component may provide the overlaid tile to extract all enclosed points. Each tile 78 may be overlaid over each successive portion of each dataset to extract dots and edges, as shown in FIGS. 5A-5B, with FIG. 5A pertaining to first dataset 68A and FIG. 5B pertaining to second dataset 68B. These extracted portions may then be compared.

In some embodiments, the disclosed overlaying may comprise a prepositioning of the tile in a corresponding region of the first data's representation. For example, a top-left corner of tile 78A may be placed overlaying a top-left corner of the first data's representation.

In some implementations, the first or second set of features may comprise a set of features that represent no roads, as is exemplarily depicted in the bottom-right corner of FIG. 5A.

When comparing geo-referenced images rather than a vectorized list of roads, information component 30 may obtain two or more datasets each having a bit map that comprises hot bits for where a road is and cold bits for where the road is not. Comparison component 34 may use an intersection over union method (e.g., Jaccard index) or another suitable metric (e.g., average path length similarity), to determine a statistic for gauging similarity and/or diversity between the bit maps. For example, comparison component 34 may determine how similar two pixel maps are, e.g., by taking a number of pixels where both sources agree in predicting a road and then by dividing the number by a sum of pixels indicating when either source predicts a road. This approach may result in a disagreement level that ranges, e.g., from zero to one, zero indicating perfect agreement, and one indicating nothing in common.

When comparing geo-data vectors, a relatively course metric may be used, which compares the relative lengths of vectors in a particular region. Although this output may also be between zero and one, this different approach may indicate that a relative length may, e.g., be 0.5 where roads of two sources have a same length, be close to zero where one source has a much longer length, and be close to one where the other source has a much longer length. As such, perfectly equal lengths would be right in the middle of the scale. However, this metric may not capture all aspects of interest. Therefore, some embodiments of comparison component 34 may use a different measure, e.g., a rescaled Hausdorff.

The rescaled Hausdorff metric may be used by comparison component 34 to compare two vector sets and to identify different modalities of error. For example, two sets are considered close in the Hausdorff distance if every point of either set is close to some point of the other set. In this example, comparison component 34 may determine how far a maximum distance walk would be between the two sets, this distance being the greatest of all the distances from a point in one set to the closest point in the other set. By this latter approach, comparison component 34 may determine both lines that are just misaligned but are the same road and also a line that is present in one set but entirely missing in the other. Comparison component 34 may accomplish this by dividing this maximum distance by the diagonal distance of the grid cells in which are the lines. The output may be normalized or scaled, e.g., with extremes between zero and one, rather than 0.5 indicating equality as with the relative-lengths approach.

Figure 6B:
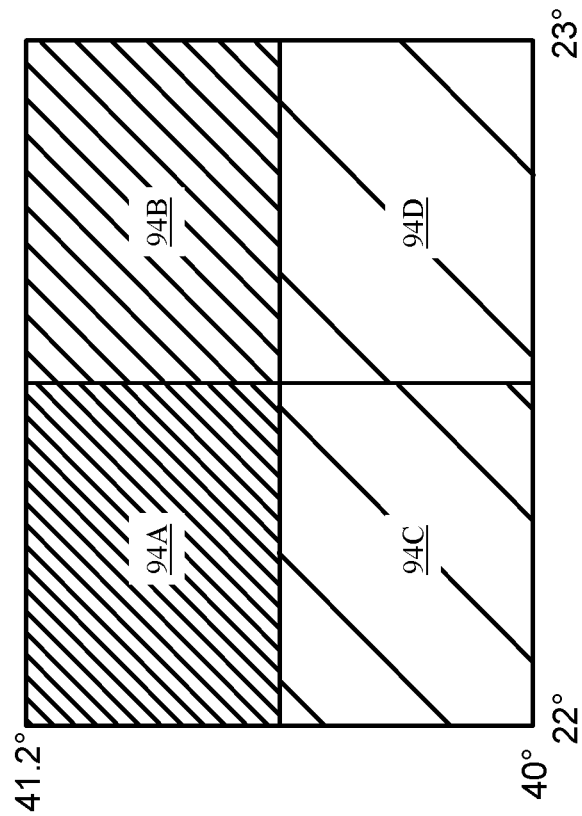
FIG. 6A illustrates a matrix of dissimilarity levels calculated based on comparisons of the respective portions and FIG. 6B illustrates representations differently emphasizing the respective dissimilarity levels, in accordance with one or more embodiments.
Figure 6A:
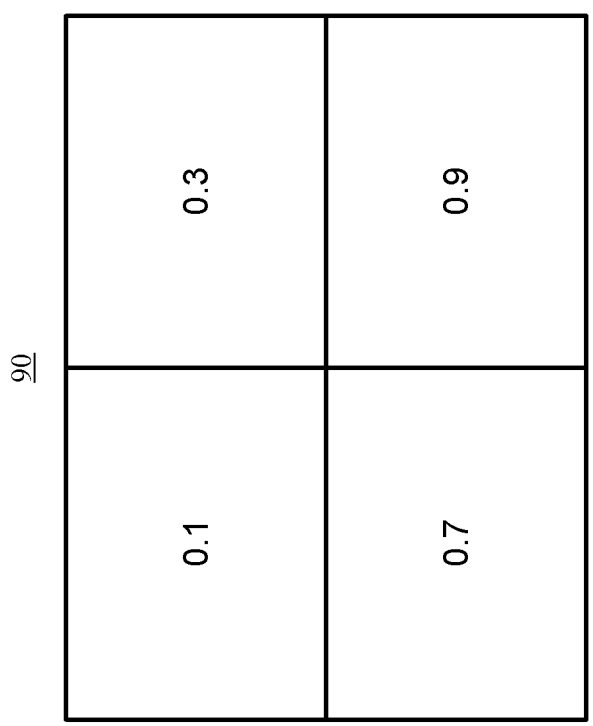

Exemplary depictions of determined comparison values are shown in FIG. 6A, which map to different levels of shading for easily visualizing problem areas. In this example, the bottom-right corner has a disagreement level of 0.9, which is high because the bottom-right corners of FIGS.

5A and 5B are very different, and the top-left corners of FIGS. 5A-5B conversely have a low disagreement level (0.1 in FIG. 6A) due to the high level of similarity. Still continuing with this example, darker regions due to heavier shading are regions of low dissimilarity, whereas lighter regions due to lighter shading are regions of high dissimilarity. As such, the dissimilarity may be conveyed with a single light channel (e.g., red, green, blue, another hue, or grayscale) or single color band. FIG. 6A depicts matrix 90 of disagreement levels or disagreement metrics. In some embodiments, comparison component 34 may export these disagreement levels/metrics as a geo-referenced image (e.g., GeoTIFF) for subsequent rendering, using different light characteristics of the single channel.

In some embodiments, rendering component 36 may indicate different levels of similarity with respectively different colors, textured shading, or another visual approach. For example, this component may determine a blurring average and perform a deep map approach, with blurrier regions indicating either areas of agreement or areas of disagreement. In another example, this component may perform a blurring filter across determined similarity values to determine where there are neighborhoods of accuracy or other neighborhood affects.

Figure 9:
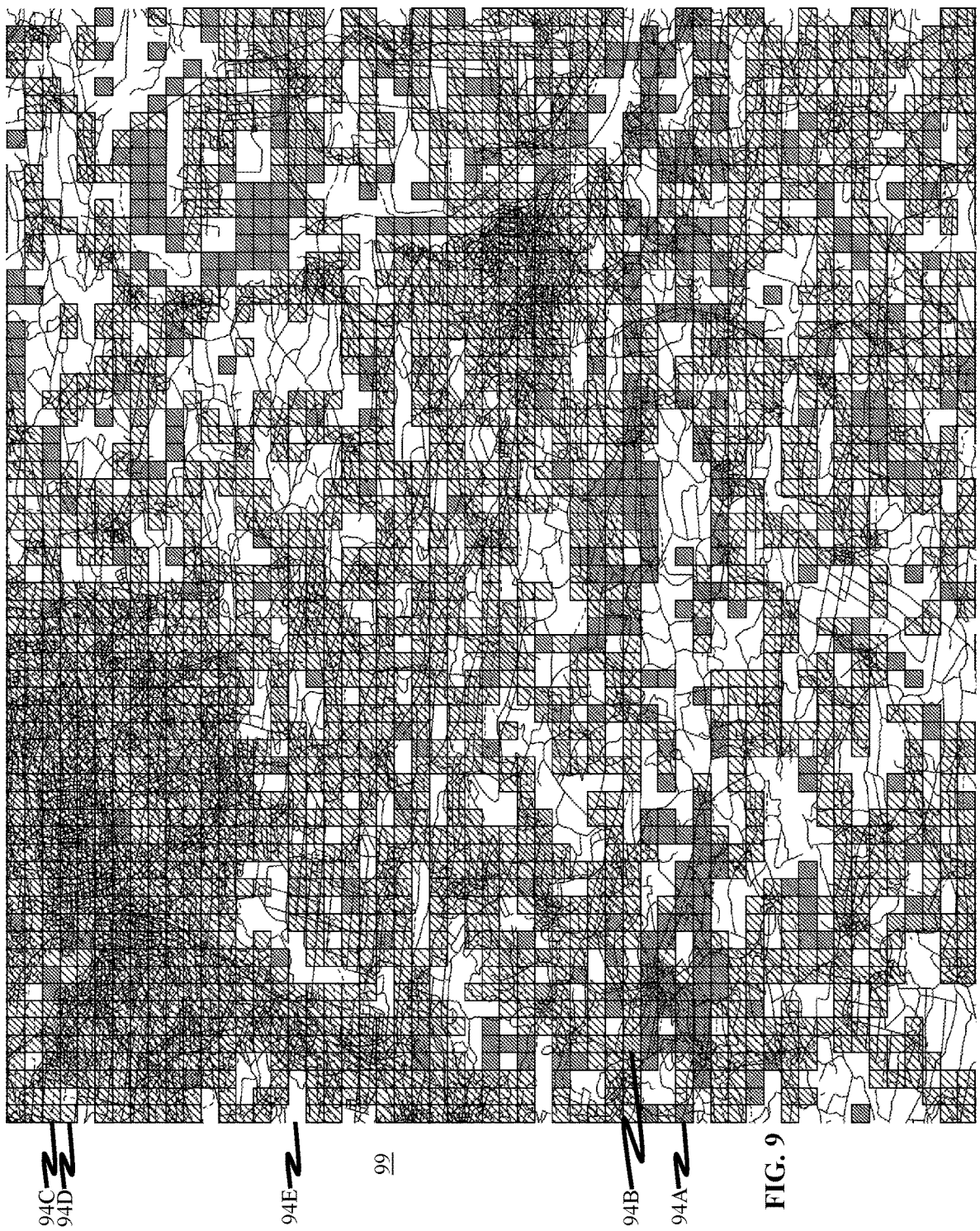
FIG. 9 illustrates the same content as in FIG. 8 except for the additional overlaying of representations of the respective dissimilarity levels, in accordance with one or more embodiments.
Figure 10:
FIG. 10 illustrates a sub-region of the larger region depicted in FIG. 9, in accordance with one or more embodiments.

In some embodiments, rendering component 36 may indicate the different levels of similarity, e.g., with hot and cold tiles as depicted in each of FIGS. 6B and 9-10. In other embodiments, this component may determine a more smooth transition between the different levels, e.g., resembling a weather map.

Figure 8:
FIG. 8 illustrates the first and second source data overlaying one another, in accordance with one or more embodiments.

At a macro level, FIG. 7A exemplarily depicts source data 98A. In this figure, first source data 98A is more heavily labeled in the urban region of the upper-left corner than FIG. 7B, which exemplarily depicts second source data 98B; second source data 98B is more heavily labeled in the remaining areas. When the user visualizes both sources simultaneously, as exemplarily depicted in FIG. 8 with the sources overlaying each other, the user's challenge becomes apparent. The unaided user would have to proceed by zooming in on a visualization (e.g., FIG. 8) and sweeping through it, identifying and repairing source disagreements as they are found. By the herein-disclosed approach, however, the user can generate a local similarity heatmap (e.g., at a configurable local resolution) to highlight the areas where these sources most strongly disagree. FIG. 9 exemplarily shows combination 99, i.e., with 64×64 tiles 94 overlaying sources 98A and 98B of FIG. 8. In this example, rendering component 36 outputs a spatial raster dataset that respectively highlights (with shading, coloring, texture, hatching, etc.) the extent to which regions of the two input datasets agree via tiles 94A-94E.

Tasking of a user analyst may thus be substantially accelerated by the synergistic combination of the source data, since the user does not otherwise have to be bogged down by visually inspecting each and every spatial region. For example, rendering component 36 may perform conflation assistance by visualizing or representing the source data such that problem areas are more accurately identified and more readily visible (i.e., by a highlighting or other type of formatting). In this or another example, reconciliation component 38 may determine from the source datasets a single, pared-down dataset that has all information from both (or more) sources but that corrects disagreement areas, for optional display using a same GIS tool that is configured to display the unreconciled sources.

In some implementations, the tasking of the user analyst may be made manageable by focusing on a set of tiles or neighborhood, rather than attempting to resolve disagreement across an entire geometry. For example, as exemplarily depicted in FIGS. 9-10, the cross-hatched heatmap may be brightest where the sources most strongly disagree (e.g., with pure white representing regions where one source is completely absent) and be darkest where the sources most strongly agree (e.g., with dense hatching or pure black representing regions where the sources are identical). This approach allows the user to apply their efforts much more efficiently than in a full sweep. For example, smaller regions may be targeted for repair in order of intensity of need. Rendering component 36 may target the brightest regions, reconciliation component 38 may cause repairs, and then rendering component 36 may regenerate the heatmap. This process may be iterated or repeated until the most dissimilar local regions are all within the required tolerances. The process may even be automated in such fashion that the most dissimilar local regions is presented to the user for repair directly, e.g., without need for the user to consult the heatmap.

In some embodiments, rendering component 36 may determine a color or shading for a tile indicating a level of disagreement, for sending up to an analyst for troubleshooting. For example, a dark box (or in another example, a light box) may indicate that the analyst does not have to address (e.g., repair) that region, since the color or shading coding may indicate strong agreement. In this example, a white box (or in the other example, a dark box) may indicate that the analyst does have to address that region. By identifying or filtering out regions that are safe for an analyst to assume that the sources are in agreement, rendering component 36 may cause an analyst to spend considerably less time (e.g., less than eight hours rather than over ten hours). For example, lighter regions may be used to indicate highest disagreements such that an analyst may use a triage approach for inspecting first for possible repair. FIG. 10 depicts an exemplary triage attempt, by showing a subset of tiles 94. In another example (not shown) roads and a disagreement level of only one tile may be displayed to the user.

In some embodiments, rendering component 36 may implement a script that would, in the GIS software, run a similarity analysis and then automatically bring to an analyst user's attention the regions of greatest dissimilarity (e.g., by overlaying source data 98A/98B with tiles 94 for viewing and optional editing). As such, rendering component 36 may perform iterative displaying such that a view of problem region(s) is displayed one identified portion of the image at a time, in a determined order (i.e., with the order being determined based on the disagreement levels). For example, the user may be directed through a particular series of problem regions (which may each include a set of tiles and tile portions, as in FIG. 10) in a prioritized order, the most dissimilar regions being displayed first to address the biggest problems earliest. By this approach, reconciliation that satisfies a quality level may be accomplished without having to address every problem region. And this may be because an intent of reconciliation component 38 is to repair the roads' disagreement within all of the tiles to a required tolerance (e.g., road lines within 4.5 meters of truth and/or with 60% of the roads labeled). For example, responsive to a determination that the user's GIS software is operable to automatically reconcile a difference between the each pair, reconciliation component 38 may automatically cause reconciliation of the differences (e.g., of the road networks). In another example, the UI devices 18 may be configured to facilitate edits of the first data or the second data for manually reconciling differences.

In some embodiments, rendering component 36 may improve a user's initial inspection phase by not requiring the user to inspect every region. That is, this component may provide visualization(s) of source similarity at a local level that is compatible with the GIS software the user already employs, the term local implying one or more tiles in a spatial region. As such, rendering component 36 may be configured to display identified local regions where similarity is low to make repairs. The user's tasking may thus be improved by not needing to perform inspection and initial analysis. As an analogy, to fix a leaky tire, one must first find the hole to repair it. Here, rendering component 36 emphasizes the problems automatically, allowing the user to vastly more efficiently focus on only the repair.

In some embodiments, processor(s) 20 may be used to add support for conflation of other features (e.g., widths of particular roads, whether paved or unpaved, buildings rather than roads, or another suitable feature).

FIG. 10 shows two road networks that are the same in many places but different in others, the depiction therein being on a scale of about a few dozen meters by a few dozen meters. Comparison component 34 may examine all roads that are in every tile, but it does not then inform the analyst user specifically which roads contributed to this metric. And this may be because the Hausdorff metric is based on the entire set of roads as a single entity.

FIG. 10 exemplarily depicts one or more regions of interest, particularly for including areas of disagreement between data sources 98A and 98B. For example, FIG. 10 exemplarily depicts several tiles 94 hatched to represent their particular disagreement levels, with the tiles of a region being all, substantially, or a majority black (or white), e.g., due to more or less agreement between the sources. Although each of FIGS. 9-10 show emphasized tiles 94 overlaying source data 98A and 98B, each of these depicted components may be toggled on/off such that some implementations may display: only source data 98A, only source data 98B, both 98A and 98B without 94, both 98A and 98B with 94, only 94, 94 with only 98A, or 94 with only 98B. As such, UI devices 18 may be configured for obtaining, from the user, a configuration setting for individually toggling display of the overlaying.

By a user zooming-in to the bottom-middle portion of FIG. 9, the user may be displayed FIG. 10, since FIG. 10 is a subset of FIG. 9.

Although four different levels of shading/hatching are shown in FIG. 6B and five different levels of shading/hatching are shown in FIGS. 9-10, any number of thresholds may be employed for respectively having any number of disagreement levels.

In some embodiments, reconciliation component 38 may track corrections made and identify when an accuracy threshold is successfully breached (e.g., when the most divergent tiles are reconciled with each other, effectively bringing the overall divergence to within this threshold).

In some embodiments, reconciliation component 38 may support different types of contracts with different aspects such that different standards can be met, e.g., in terms of acceptable error. For example, one contract may require road labels to be within 4.5 meters of the two locations to be acceptable. This 4.5 meter threshold, for informing a user analyst whether repair needs to be performed, may be used by rendering component 36 when determining the similarity levels. This may allow comparison component 34 to be very flexible, the thresholds for defining the dissimilarity levels being configurable. As such, different colors or shadings may be triggered for display for different dissimilarity levels in different implementations.

Figure 11:
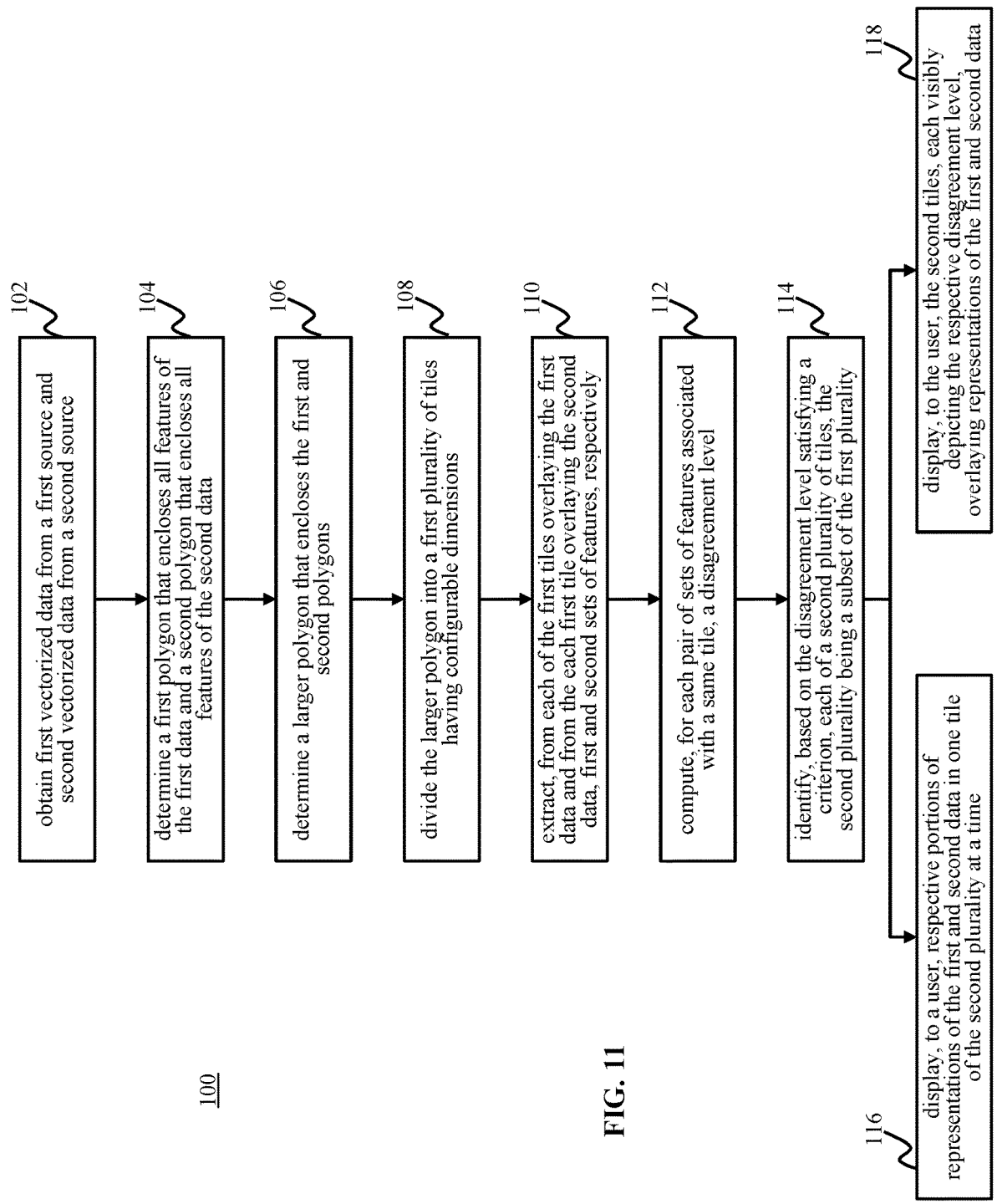
FIG. 11 illustrates a process for presenting local dissimilarity levels, in accordance with one or more embodiments.

FIG. 11 illustrates method 100 for processing alternative sources of geodata covering the same spatial region and creating georeferenced imagery to communicate to analysts the extent to which the sources agree in localized areas, in accordance with one or more embodiments. Method 100 may be performed with a computer system comprising one or more computer processors and/or other components. The processors are configured by machine readable instructions to execute computer program components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 11 and described below is not intended to be limiting. In some embodiments, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

At operation 102 of method 100, first vectorized data and second vectorized data may be obtained from first and second sources, respectively. As an example, source data 68A (or 98A) and other source data 68B (or 98B) may be obtained. In some embodiments, operation 102 is performed by a processor component the same as or similar to information component 30 (shown in FIG. 1 and described herein).

At operation 104 of method 100, a first polygon, which encloses all features of the first data, and a second polygon, which encloses all features of the second data, may be determined. As an example, rectangle 70A may enclose the features of source data 68A, and rectangle 70B may enclose the features of source data 68B. In some embodiments, operation 104 is performed by a processor component the same as or similar to segmentation component 32 (shown in FIG. 1 and described herein).

At operation 106 of method 100, a larger polygon that encloses the first and second polygons may be determined. As an example, rectangle 74 may be larger than each of bounding boxes 70A and 70B. In some embodiments, operation 106 is performed by a processor component the same as or similar to segmentation component 32 (shown in FIG. 1 and described herein).

At operation 108 of method 100, the larger polygon may be divided or segmented into a first plurality of tiles having configurable dimensions. As an example, larger bounding box 74 may be segmented into tiles 78A, 78B, 78C, and 78D. In some embodiments, operation 108 is performed by a processor component the same as or similar to segmentation component 32 (shown in FIG. 1 and described herein).

At operation 110 of method 100, first and second sets of features may respectively be extracted from each of the first tiles overlaying the first data and from the each first tile overlaying the second data. As an example, each of subset 80A, subset 80B, subset 80C, and subset 80D and each of subset 84A, subset 84B, subset 84C, and subset 84D may be identified. In some embodiments, operation 110 is performed by a processor component the same as or similar to segmentation component 32 (shown in FIG. 1 and described herein).

At operation 112 of method 100, a disagreement level may be computed for each pair of sets of features associated with a same tile. As an example, subset 80A may be compared with subset 84A to determine a disagreement level of 0.1, subset 80B may be compared with subset 84B to determine a disagreement level of 0.3, subset 80C may be compared with subset 84C to determine a disagreement level of 0.7, and subset 80D may be compared with subset 84D to determine a disagreement level of 0.9; these different disagreement levels may be depicted with different amounts of hatching, such as 94A, 94B, 94C, and 94D (94E exemplarily representing complete disagreement), respectively. The computations may be performed for each pair of the first and second sets of features in a same tile-positioning of the segmentation. In some embodiments, operation 112 is performed by a processor component the same as or similar to comparison component 34 (shown in FIG. 1 and described herein).

At operation 114 of method 100, each of a second plurality of tiles may be identified based on the disagreement level satisfying a criterion, the second plurality of tiles being a subset of the first plurality of tiles. As an example, one or more of the tiles of FIG. 9 may be identified, as depicted in FIG. 10. In some embodiments, operation 114 is performed by a processor component the same as or similar to rendering component 36 (shown in FIG. 1 and described herein).

At operation 116 of method 100, respective portions of representations of the first and second data may be displayed, to a user, in one or more tiles of the second plurality at a time. As an example, the portions of one tile may be displayed. In another example, the portions of a few tiles (e.g., a subset less than 15) may be displayed. In some embodiments, operation 116 is performed by a processor component the same as or similar to rendering component 36 (shown in FIG. 1 and described herein).

At operation 118 of method 100, the second plurality of tiles may be displayed, to the user, the second tiles overlaying representations of the first and second data. Each of the second tiles may visibly depict the respective disagreement level. As an example, combination 99 of source data 98A, other source data 98B, and tiles 94 may be exemplarily displayed, as in FIG. 9. In some embodiments, operation 118 is performed by a processor component the same as or similar to rendering component 36 (shown in FIG. 1 and described herein).

Techniques described herein may be implemented in digital electronic circuitry, or in computer hardware, firmware, software, or in combinations of them. The techniques may be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps of the techniques may be performed by one or more programmable processors executing a computer program to perform functions of the techniques by operating on input data and generating output. Method steps may also be performed by, and apparatus of the techniques may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory may be supplemented by, or incorporated in special purpose logic circuitry.

Several embodiments of the invention are specifically illustrated and/or described herein. However, it will be appreciated that modifications and variations are contemplated and within the purview of the appended claims.

What is claimed is:

1. A method for conflating data sources, the method comprising:
   obtaining first data from a first source and second data from a second source, wherein the first and second data cover at least a portion of a same spatial region, and wherein each of the first and second data comprises an aerial or satellite image that is converted to a vectorized list of roads;
   determining a first polygon that encloses the roads of the first data of the first source;
   determining a second polygon that encloses the roads of the second data of the second source, wherein the first and second polygons are of different sizes;
   determining a polygon that simultaneously encloses both of the first and second polygons;
   dividing the larger polygon into a first plurality of tiles, each belonging to a different portion;
   overlaying each of the first plurality of tiles over a corresponding portion of each of the first polygon and the second polygon;
   extracting, for a portion of the first data and a portion of the second overlayed by a respective tile of the first plurality of tiles, a first and second set of features, respectively;
   comparing the first set of features extracted from each of the portions of the first data with the second set of features extracted from the corresponding portion of the second data;
   computing, for each of the comparisons, a disagreement level;

selecting, from the first plurality of tiles based on at least one of the computed disagreement levels satisfying a set of criteria, a second set of tiles;

outputting each of the second set of tiles overlaying a representation of a respective portion of the first data and/or a representation of a respective portion of the second data; and iteratively displaying, to a user in a prioritization order according to the disagreement levels, the each second tile.

2. The method of claim 1, further comprising:
determining, based on the disagreement levels, the order.

3. The method of claim 1, further comprising:
responsive to a determination that a geographic information system (GIS) software is operable to automatically reconcile a difference between each pair of the first and second sets of features, automatically reconciling the differences.

4. The method of claim 1, wherein the second set of tiles is displayed to a user of a user interface of a GIS software application.

5. The method of claim 4, wherein the user interface is configured to facilitate edits of the first data or the second data for manually reconciling differences.

6. The method of claim 4, further comprising:
displaying, to the user, the first plurality of the tiles overlaying a representation of the first data and/or a representation of the second data.

7. The method of claim 6, wherein the overlaying is performed by GIS software displaying each of the one or more tiles using a color, texture, or shading that is selected based on the respective disagreement level.

8. The method of claim 2, further comprising:
obtaining, from the user, a configuration setting for individually toggling display of the overlaying.

9. The method of claim 1, further comprising:
determining whether an overlapping region exists between the first and second polygons,
wherein the determination of the larger polygon is performed responsive to the determination that the overlapping region exists.

10. A non-transitory, computer-readable medium comprising instructions executable by at least one processor to perform a method, the method comprising:
determining a first polygon that encloses roads of first data from a first source;
determining a second polygon that encloses roads of second data from a second source, wherein the first and second data cover at least a portion of a same spatial region, wherein the first and second data comprise aerial or satellite images converted to a vectorized list of the roads, and wherein the first and second polygons are of different sizes;
determining a polygon that simultaneously encloses both of the first and second polygons;
dividing the larger polygon into a plurality of tiles, each belonging to a different portion;
overlaying each of the first plurality of tiles over a corresponding portion of each of the first polygon and the second polygon;
comparing a first set of features extracted from each of the portions of the first data with a second set of features extracted from the corresponding portion of the second data;
computing, for each of the comparisons, a disagreement level;

selecting a second set of tiles from the first plurality of tiles based on at least one of the computed disagreement levels that satisfies a criterion;

displaying, to a user in one of the selected tiles being overlaid and according to a prioritization order according to the disagreement levels, features of a respective portion of the first data and features of a respective portion of the second data.

11. The medium of claim 10, wherein the method further comprises:
obtaining, before the division via a user interface, user-provided dimensions of the plurality of tiles.

12. The medium of claim 10, wherein each of the features comprises a vertex or edge.

13. The medium of claim 10, wherein each of the first and second data is a geometry file.

14. The medium of claim 10, wherein GIS software is used to display each of the one or more tiles using a color, texture, or shading that overlays a representation of the first data and/or a representation of the second data.

15. The medium of claim 14, wherein the method further comprises:
obtaining, from the user, a configuration setting for toggling the display of the overlaying.

16. A non-transitory, computer-readable medium comprising instructions executable by at least one processor to perform a method, the method comprising:
determining a first polygon that encloses roads of first data from a first source;
determining a second polygon that encloses roads of second data from a second source, wherein the first and second data cover at least a portion of a same spatial region, wherein the first and second data comprise aerial or satellite images converted to a vectorized list of the roads, and wherein the first and second polygons are of different sizes;
determining a polygon that simultaneously encloses both of the first and second polygons;
dividing the larger polygon into a first plurality of tiles, each belonging to a different portion;
overlaying each of the first plurality of tiles over a corresponding portion of each of the first polygon and the second polygon;
comparing a first set of features extracted from each of the portions of the first data with a second set of features extracted from the corresponding portion of the second data;
computing, for each of the comparisons, a disagreement level;
selecting a second plurality of tiles from the first plurality of tiles based on at least one of the computed disagreement levels satisfying a set of criteria; and
displaying, to a user, the second plurality of tiles overlaying representations of the first data and the second data according to a prioritization order based on the disagreement levels.

17. The medium of claim 16, wherein each of the first data, the second data, and the second plurality of tiles is selectable for removal from the display, and
wherein each of the second plurality of tiles is displayed using a single color channel, a hue or intensity of the single channel being automatically selected based on the respective disagreement level.

18. The medium of claim 16, wherein the method further comprises:
forming a road dataset by combining road lines extracted from a hand-drawn surveyor's map, road lines extracted from automobile GPS records, and road lines extracted from aerial imagery.

19. The medium of claim 16, wherein the first and second data are geometry files and are combined to create third data that reconciles differences between the first and second data resulting in a more accurate representation of roads.

* * * * *